(12) United States Patent
Carter et al.

(10) Patent No.: US 12,135,948 B2
(45) Date of Patent: Nov. 5, 2024

(54) GENERATING BIAS SCORES FROM ARTICLES

(71) Applicant: Biasly, LLC, Sandy, UT (US)

(72) Inventors: Daniel Carter, Salt Lake City, UT (US); Haochuan Wei, Jiangsu (CN); Arjun Karangiya, Gujarat (IN); William Lucia, Cassano M. (IT)

(73) Assignee: Biasly, LLC, Sandy, UT (US)

( * ) Notice: Subject to any disclaimer, the term of this patent is extended or adjusted under 35 U.S.C. 154(b) by 346 days.

(21) Appl. No.: 17/565,844

(22) Filed: Dec. 30, 2021

(65) Prior Publication Data
US 2023/0214603 A1  Jul. 6, 2023

(51) Int. Cl.
*G06F 40/40* (2020.01)
*G06F 16/35* (2019.01)
*G06F 40/205* (2020.01)

(52) U.S. Cl.
CPC .............. *G06F 40/40* (2020.01); *G06F 16/35* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 2018/0341839 A1* | 11/2018 | Malak | G06F 40/205 |
| 2018/0373701 A1* | 12/2018 | McAteer | G06F 16/9024 |
| 2019/0082224 A1* | 3/2019 | Bradley | G06Q 30/0282 |
| 2020/0334369 A1* | 10/2020 | Koch | G06N 5/02 |
| 2020/0372067 A1* | 11/2020 | Otero | G06F 16/48 |
| 2021/0019339 A1* | 1/2021 | Ghulati | G06N 20/00 |
| 2021/0256629 A1* | 8/2021 | Jolly | G06Q 50/01 |

* cited by examiner

*Primary Examiner* — Stella L. Woo
(74) *Attorney, Agent, or Firm* — Kirton McConkie; Brian Tucker (57) ABSTRACT

Bias scores can be generated from articles. A bias score generator can be configured to aggregate and process articles to identify entities and policies that appear in the articles and to generate sentiment values for the entities and policies. Aspect-based targeted sentiment analysis may be employed to generate the sentiment values. The bias score generator can process the sentiment values to generate a bias score for each article. Bias scores for multiple articles can be combined to generate a media bias score for a source of the articles. Bias loaded words and bias loaded snippets may also be used to generate a media bias score.

20 Claims, 8 Drawing Sheets

| Media Source Bias Scores | | |
|---|---|---|
| Media Source | Bias Score | Articles |
| ABC News | -2% Liberal | View Articles |
| CNN | -10 Liberal | View Articles |
| The Wall Street Journal | 20% Conservative | View Articles |
| ... | | |

| ABC News Policy Leanings | |
|---|---|
| Policy | Bias Score |
| Abortion | 89% Conservative |
| Clean Energy | -56% Liberal |
| DACA | 12% Conservative |
| ... | |

*FIG. 4*

| Donald Trump | |
|---|---|
| Policy Leanings | 12% Conservative |
| Media Portrayal | 72% Negative |

| Donald Trump Policy Leanings | | |
|---|---|---|
| Policy | Sentiment | Bias Score |
| Abortion | 16% Against | 20% Conservative |
| Border Control | 36% For | 34% Conservative |
| ... | | |

*FIG. 5*

GENERATING BIAS SCORES FROM ARTICLES

CROSS-REFERENCE TO RELATED APPLICATIONS

N/A

BACKGROUND

Media has become increasingly biased. It is difficult to know which media sources can be trusted to provide an accurate report of political issues and current events. The media bias contributes to increasing division within society. Without an understanding of media bias, consumers of media are likely to be misguided into believing only what they read.

BRIEF SUMMARY

The present invention extends to systems, methods, and computer program products for generating bias scores from articles. A bias score generator can be configured to aggregate and process articles to identify entities and policies that appear in the articles and to generate sentiment values for the entities and policies. Aspect-based targeted sentiment analysis may be employed to generate the sentiment values. The bias score generator can process the sentiment values to generate a bias score for each article. Bias scores for multiple articles can be combined to generate a media bias score for a source of the articles.

In some embodiments, the present invention may be implemented as a method for generating bias scores from articles. An article can be processed to identify one or more entities and one or more policies that appear in the article. For each of the one or more entities and one or more policies that appear in the article, a sentiment value may be generated. The sentiment values can be combined to yield a bias score for the article.

In some embodiments, the present invention may be implemented as computer storage media storing computer executable instructions which when executed implement a method for generating bias scores from articles. An article can be processed to generate an entity map and a policy map. The entity map may identify entities that appear in the article, and the policy map may identify policies that appear in the article. For each entity in the entity map and each policy in the policy map, one or more portions of the article in which the entity or policy appears may be processed to generate a sentiment value for the entity or policy. For each entity and policy, a sentiment score may be created from the respective sentiment values. The sentiment scores can be combined to generate a bias score for the article.

In some embodiments, the present invention may be implemented as a system for generating bias scores from articles. The system may include one or more processors and computer storage media storing computer executable instructions which when executed by the one or more processors implement a bias score generator. The bias score generator may include: an article aggregator that aggregates articles; an entity and policy recognizer that processes the articles to identify entities and policies; a sentiment calculator that generates sentiment values for the entities and policies using a machine learning targeted sentiment analysis; a bias score calculator that generates a bias score for each article using the sentiment values generated for the entities and policies that appear in the article; and a bias score publisher that publishes the bias scores for the articles or a media bias score generated from the bias scores for the articles.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "article" should be broadly construed as a piece of content, regardless of its format, that is produced by a media source (e.g., a news article posted online or distributed via an RSS feed). The term "entity" can represent a person (e.g., a politician or public figure) or a group of persons (e.g., a political party, a company, a think tank, or another organization) that may appear in an article. The term "policy" should be given its customary meaning and may also appear in an article in conjunction with an entity. In general terms, a policy can be something towards which an entity may have a sentiment.

Embodiments of the present invention encompass techniques for generating bias scores from articles. In some embodiments, the bias scores could be media bias scores that represent the extent to which a media source is liberal or conservative or the extent to which a particular article is liberal or conservative. In some embodiments, the bias scores could be entity-based bias scores that represent the extent to which an entity, such as a politician, is liberal or conservative in general and/or with regards to a particular policy. In some embodiments, other scores may also be generated such as a media portrayal score representing the extent to which an entity is positively or negatively portrayed by the media, and a sentiment score representing an entity's sentiment toward a policy.

Figure 1:
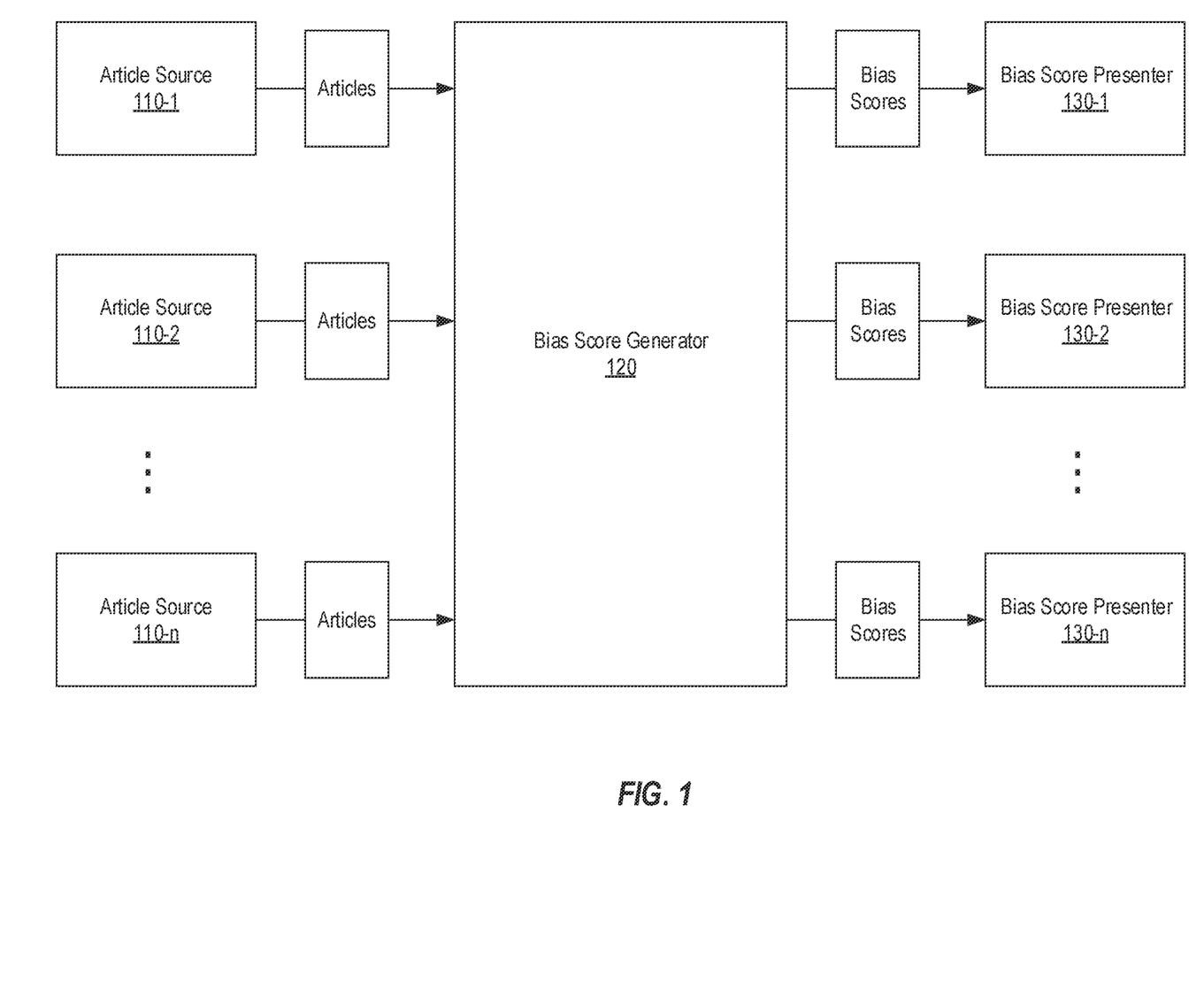
FIG. 1 illustrates a computing environment in which one or more embodiments of the present invention may be implemented.

FIG. 1 illustrates an example computing environment in which embodiments of the present invention could be implemented. This computing environment may include one or more article sources 110-1 through 110-n (individually or collectively article source(s) 110) that provide articles, a bias score generator 120 that receives articles from article sources 110 and generates bias scores (or possibly other scores) from the articles, and one or more bias score presenters 130-1 through 130-n (individually or collectively bias score presenter(s) 130) that enable end users to access the bias scores. A common example of an article source 110 is a news outlet such as CNN, Fox News, ABC News, etc. A bias score presenter 130 could commonly be a website, browser extension, application, or mobile application.

Bias score generator 120 can represent any type and/or collection of computing components that are capable of implementing the functionality described herein. In a common example, bias score generator 120 could be implemented in the cloud or on a dedicated server. Bias score generator 120 can receive articles from article sources 110 in any suitable manner including by capturing the textual content of the articles from a website, an RSS feed or any other communication mechanism, transcribing articles in audio or video format, performing optical character recognition of articles in printed format, etc. Bias score generator 120 can also provide bias scores to bias score presenters 130 in any suitable manner such as via APIs, data structures, etc.

Figure 2:
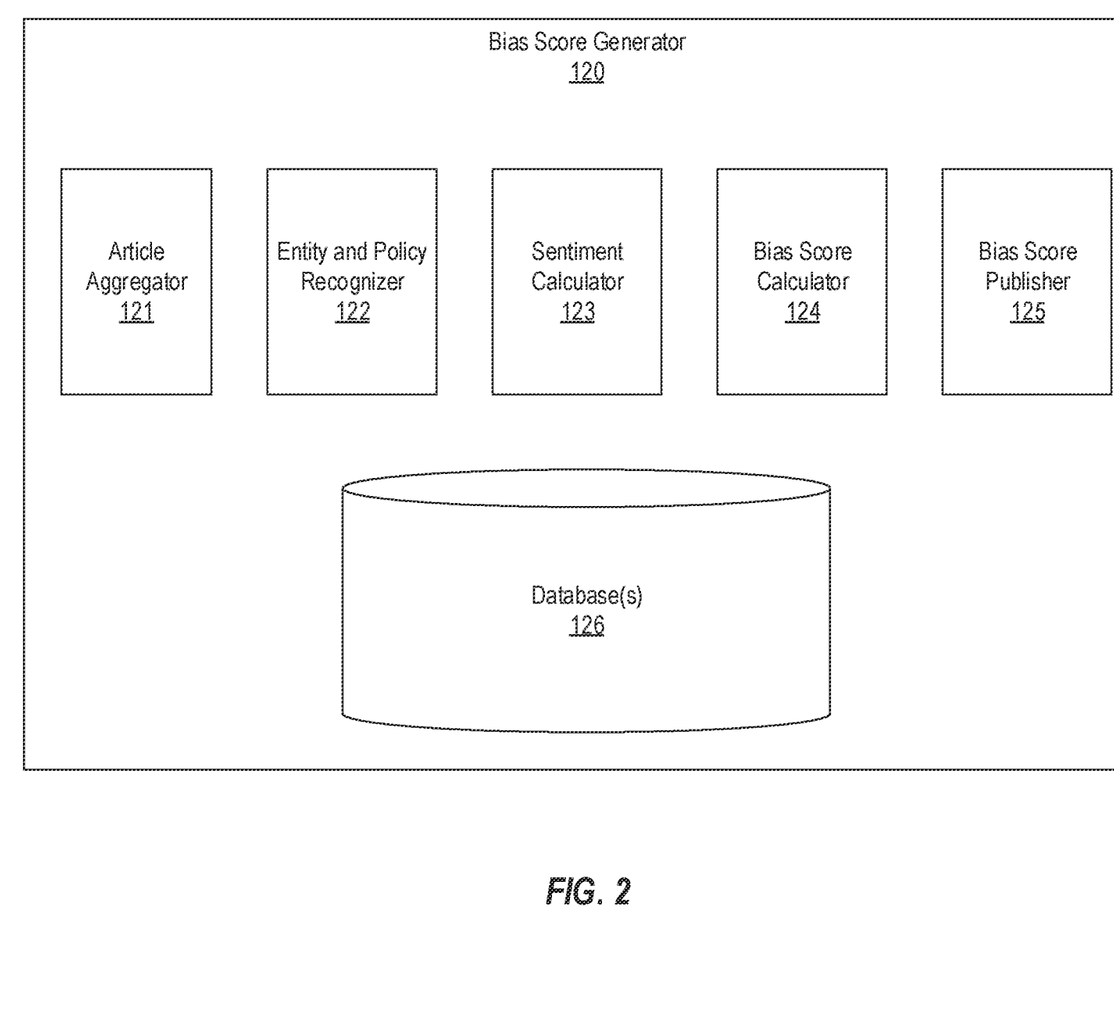
FIG. 2 provides an example of how a bias score generator could be configured in one or more embodiments of the present invention.

FIG. 2 is a block diagram representing how bias score generator 120 could be configured in one or more embodiments of the present invention. FIG. 2 includes various components that are separated based on the functionality they perform. However, embodiments of the present invention should not be limited to any particular structuring of components.

Among possibly other components, bias score generator 120 can include an article aggregator 121, an entity and policy recognizer 122, a sentiment calculator 123, a bias score calculator 124, a bias score publisher 125, and one or more databases 126. Article aggregator 121 can represent any suitable functionality for aggregating articles. As one example only, article aggregator 121 may include an RSS feed reader that retrieves articles that are published by a variety of article sources 110.

Entity and policy recognizer 122 can implement natural language processing techniques on articles to identify which entities and policies appear in the articles. In some embodiments, entity and policy recognizer 122 may also identify bias loaded words in articles. Sentiment calculator 123 can implement machine learning techniques, such as aspect-based targeted sentiment analysis, to calculate a sentiment score (and possibly other scores) for each entity or policy in an article.

Bias score calculator 124 can employ the sentiment scores to calculate a bias score for an article. Bias score calculator 124 may also employ the sentiment scores to calculate bias scores and/or media portrayal scores for entities that appear in the article. Bias score publisher 125 can represent any suitable functionality for causing the bias scores and/or other scores to be accessible to bias score presenter(s) 130. Database(s) 126 can represent any storage mechanism by which any of the above-described components store data for purposes of generating bias scores from articles in accordance with embodiments of the present invention.

FIGS. 3A-3D provide an example of how bias score generator 120 may generate one or more bias scores for an article in accordance with one or more embodiments of the present invention. In this example, it is assumed that article aggregator 121 has obtained a news article that includes the sentence shown in FIG. 3A among many other sentences. Entity and policy recognizer 122 can obtain this news article, or possibly the individual sentences from the article, from article aggregator 121, whether directly or indirectly such as via databases 126.

Figure 3A:
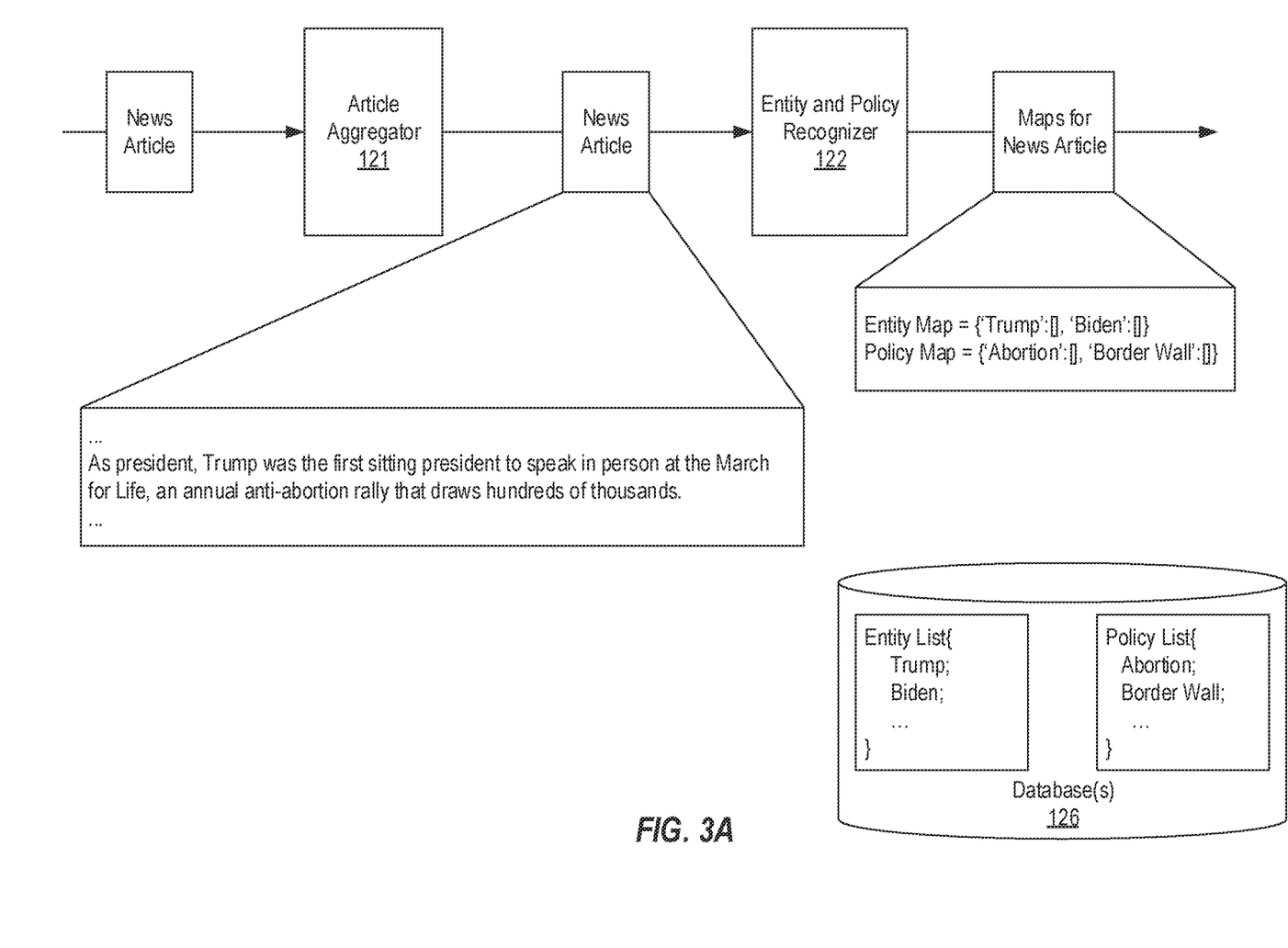
FIGS. 3A-3D provide an example of how a bias score may be generated for an article in accordance with one or more embodiments of the present invention.

FIG. 3A also represents that databases 126 can maintain an entity list and a policy list (and possibly a bias loaded words list as described below). The entity and policy lists can identify the entities and policies respectively that entity and policy recognizer 122 should identify in each article (i.e., the entities and policies that will be used to generate one or more bias scores for the article). In this example, it is assumed that the entity list includes an entry for Trump and an entry for Biden among likely many other entries. It is also assumed that the policy list includes an entry for abortion and an entry for border wall among likely many other policies. Accordingly, based on the entity and policy lists, entity and policy recognizer 122 can evaluate the news article to identify whether Trump or Biden appear in the article and whether the abortion or border wall policies are discussed in the article.

In some embodiments, entity and policy recognizer 122 may use natural language processing techniques on each sentence (or other portion) of an article to determine whether the sentence (or other portion) includes an entity from the entity list and/or a policy from the policy list. For example, entity and policy recognizer 122 could use the SpaCy library to perform "named entity" recognition on a sentence to thereby identify each named entity that appears in the sentence. Each named entity can then be compared to the entity list and the policy list to determine if the named entity is included in either list. In other words, named entity recognition may identify a wide variety of real-world objects that appear in the article and the entity and policy lists can be used to identify only those real-world objects that should be considered entities or policies for purposes of generating bias scores. Using the example in FIG. 3A, the named entity recognition may identify "Trump" and "abortion," as named entities. Since both of these named entities appear in the entity list or policy list, entity and policy recognizer 122 can consider them for purposes of calculating bias scores.

In conjunction with identifying each entity and policy in the news article, entity and policy recognizer 122 can create an entity map that includes each entity and a policy map that includes each policy. As described in greater detail below, the entity map can associate each entity with one or more sentiments and the policy map can associate each policy with one or more sentiments. At this point, however, it is assumed that the sentiments have not yet been calculated and therefore each entity and policy is associated with a null list of sentiments.

In some embodiments, this comparison between named entities recognized in the article and entities and policies defined in the entity and policy lists respectively can be performed using a similarity function with a threshold (e.g., 0.9) for an exact match. In some embodiments, an exclusion list can be maintained in database 126 and used to prevent a recognized named entity from being included in the entity map or the policy map. For example, if a particular recognized named entity may be incorrectly matched to an entity or policy in the entity or policy list (such as when the particular recognized named entity is semantically similar to another recognized named entity), but the particular recognized named entity also matches an entry in the exclusion list, entity and policy recognizer 122 can prevent the particular recognized named entity from being included in the entity or policy map.

Although not shown in FIG. 3A, the natural language processing that is performed on each sentence of the article creates tags or indications of where the entities and policies appear so that the sentiment calculations relative to the entities and policies can be performed in context. Stated another way, in addition to generating the entity map and policy map for the article, entity and policy recognizer 122 can generate information defining where each entity in the entity map appears in the article and where each policy in the policy map appears in the article. Accordingly, after entity and policy recognizer 122 has processed an article, it will have created an entity map and a policy map that identifies which entities and policies appear in the article and in which sentences (or other portions) the entities and policies appear. The entity and policy maps can then be provided to sentiment calculator 123.

Figure 3B:
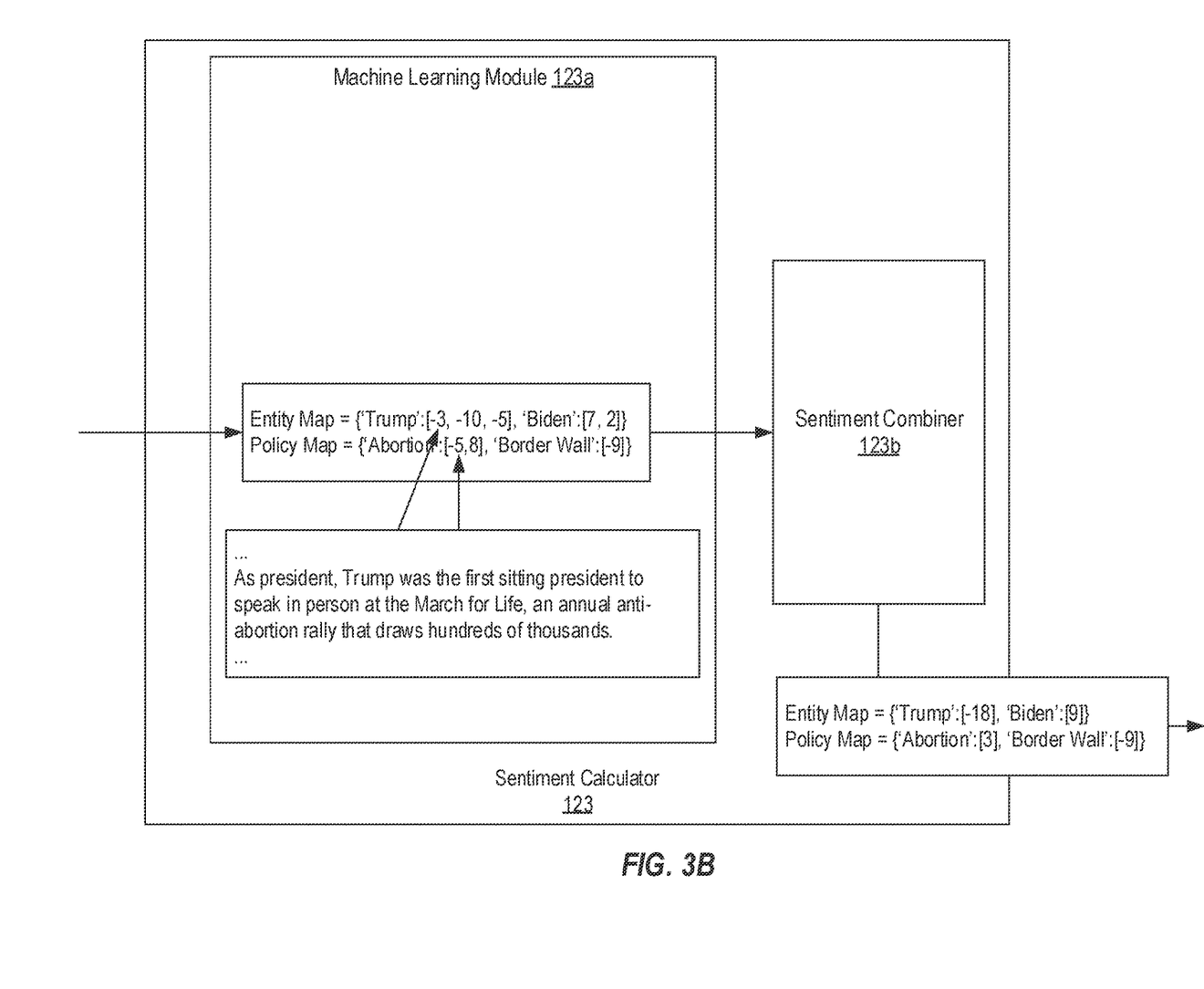

Turning to FIG. 3B, sentiment calculator 123 can include a machine learning module 123a and a sentiment combiner 123b, both of which operate on the entity and policy maps that entity and policy recognizer 122 provides for an article. Machine learning module 123a can use machine learning techniques to calculate a sentiment value for each instance of an entity and policy in the entity and policy map respectively. In some embodiments, machine learning module 123a may implement a convolutional neural network to predict a sentiment value for each entity or policy instance from the sentence in which it appears such as by implementing aspect-based targeted sentiment analysis.

Continuing the same example, FIG. 3B represents that machine learning module 123a has predicted a sentiment value of −3 for the instance of "Trump" and a sentiment value of −5 for the instance of "abortion" that appear in the sentence: "As president, Trump was the first sitting president to speak in person at the March for Life, an annual anti-abortion rally that draws hundreds of thousands." In this example, it is assumed that a sentiment value may be assigned a value from −10 to 10 where −10 is most negative, 0 is neutral, and 10 is most positive; however, any range or manner for representing sentiment could be used. It is also assumed that the news article includes two other instances of Trump, two instances of Biden, one other instance of abortion, and one instance of border wall for which machine learning module 123a has predicted a sentiment value. In other words, Trump is assumed to appear in two other sentences in the article, Biden is assumed to appear in two sentences in the article, abortion is assumed to appear in one other sentence in the article, and border wall is assumed to appear in one sentence in the article.

After populating the entity map and policy map with the predicted sentiment values, machine learning module 123a can provide the entity map and policy map to sentiment combiner 123b. Sentiment combiner 123b can be configured to combine the sentiment values that were predicted for an entity or policy. For example, sentiment combiner 123b can combine the three sentiment values for the Trump entity into a sentiment score of −18. In this example, it is assumed that sentiment combiner 123b has summed the sentiment values, but other techniques could be used to generate a sentiment score (e.g., averaging the sentiment values). Once sentiment combiner 123b has creating a sentiment score for each entity and policy in the entity map and policy map respectively, sentiment calculator 123 can pass the entity and policy maps to bias score calculator 124.

Figure 3C:
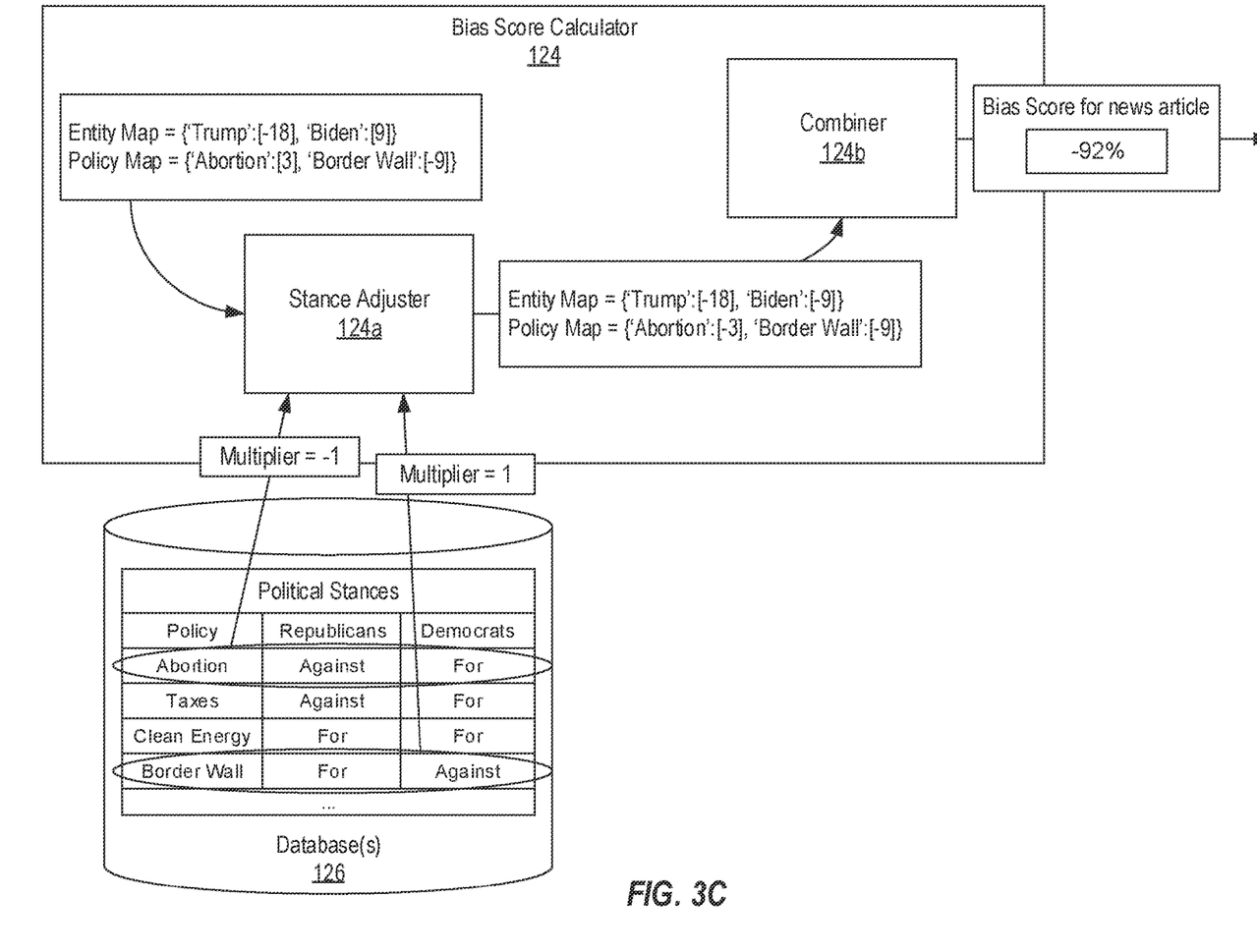

Turning to FIG. 3C, bias score calculator 124 is shown as including a stance adjuster 124a and a combiner 124b which are employed to calculate the bias score for an article using the entity and policy maps. Also, database(s) 126 are shown as including a political stances data structure that lists a number of policies and each party's stance on the policies. Although this example is limited to two parties (republicans and democrats), there could be more than two parties. Also, in this example, a stance is defined as either for or against. However, in some embodiments, a stance could be given a value on a scale such as strongly for, for, neutral, against, and strongly against.

Stance adjuster 124a can employ the political stances data structure to determine whether to adjust the sentiment score for a policy in the policy map. For example, assuming that the bias score is defined on a scale where negative numbers represent liberal bias and positive numbers represent conservative bias, policy stance adjuster 124a can apply a negative multiplier to a sentiment score for a policy if democrats are for the policy while republicans are against the policy (which is the case with abortion) or a positive multiplier to a sentiment score for a policy if republicans are for the policy and democrats are against the policy (which is the case with border wall). In some embodiments, these multipliers can be −1 and 1. However, as mentioned above, a range of multipliers could be used in some embodiments. As noted above, the sentiment scores for policies generated at this stage could be used to create per-policy bias scores for a media source.

Stance adjuster 124a can perform a similar adjustment to the sentiment score for an entity in the entity map except that the adjustment is based on the entity's political party. For example, a positive multiplier (e.g., 1) can be used for a republican and a negative multiplier (e.g., −1) can be used for a democrat.

In the depicted example, abortion has a sentiment score of 3 while border wall has a sentiment score of −9. Policy stance adjuster 124a can apply the multiplier −1 to the sentiment score for abortion and the multiplier 1 to the sentiment score for border wall to yield adjusted sentiment scores of −3 and −9 respectively. In other words, because democrats are for abortion and republicans are against abortion, policy stance adjuster 124a can flip the sign of the sentiment score for abortion. In contrast, because republicans are for a border wall and democrats are against a border wall, policy stance adjuster 124a will not flip the sign of the sentiment score for border wall.

Similarly, because Trump is a republican and Biden is a democrat, multipliers of 1 and −1 respectively can be applied to their respective sentiment scores. Accordingly, the adjusted sentiment score for Trump remains −18 while the adjusted sentiment score for Biden is flipped to −9.

After stance adjuster 124a has made such adjustments to the sentiment scores in the entity map and policy map, the entity map and policy map can be provided to combiner 124b which can combine the sentiment scores to yield the bias score for the news article. For example, combiner 124b may first combine the sentiment scores in the entity map to produce an entity sentiment score for all entities and can combine the sentiment scores in the policy map to produce a policy sentiment score for all policies. In the example, combiner 124b could combine the sentiment scores of −18 and −9 to yield −27 as the entity sentiment score and could combine the sentiment scores of −3 and −9 to yield −12 as the policy sentiment score.

After creating the entity and policy sentiment scores, combiner 124b may combine the entity sentiment score with the policy sentiment score to yield the bias score. In some embodiments, combiner 124b may apply weightings when combining the entity sentiment score and the policy sentiment score such as 0.25 and 0.75 respectively. In the example, the bias score could therefore be generated as (0.25×−27)+(0.75×−12)=−15.75. In some embodiments, the bias score for the article can be represented as a percentage. In such embodiments, combiner 124b may generate a percentage from the combined entity and policy sentiment scores such as by using the sigmoid function:

$$\frac{1}{1+e^{-xc}}$$

where c is the coefficient 0.2 and x is the value of the combined entity and policy sentiment scores. In the example, the bias score would be 0.04 or 4%. In this case, a percentage lower than 50% represents liberal bias and a percentage greater than 50% represents conservative bias. Accordingly, the news article has a strong liberal bias.

In some embodiments, the bias score may be scaled to a value between −100% and 100% so that negative bias scores represent liberal bias, and positive bias scores represent conservative bias. In such a case, the bias score for the news article in the example would be −92%

Figure 3D:
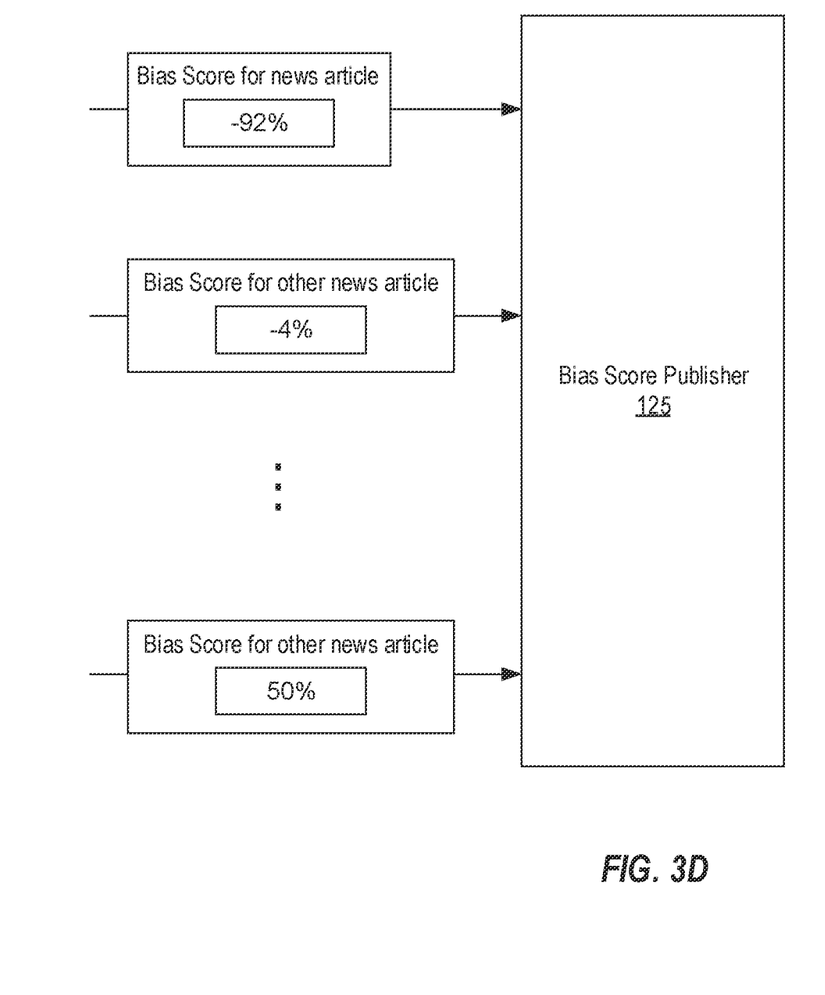

Turning to FIG. 3D, bias score calculator 124 can provide the bias score for the news article to bias score publisher. Also, the same or similar process can be performed to generate a bias score for other news articles and such bias scores can also be provided to bias score publisher 125. Bias score publisher 125 can then make the bias scores available to end users in any suitable manner.

In some embodiments, bias score publisher 125 may present media sources along with their bias scores and may provide an option to view the articles from which the bias scores were generated. Also, in some embodiments, bias score publisher 125 may present the bias scores for a media source on a per policy basis.

Figure 4:
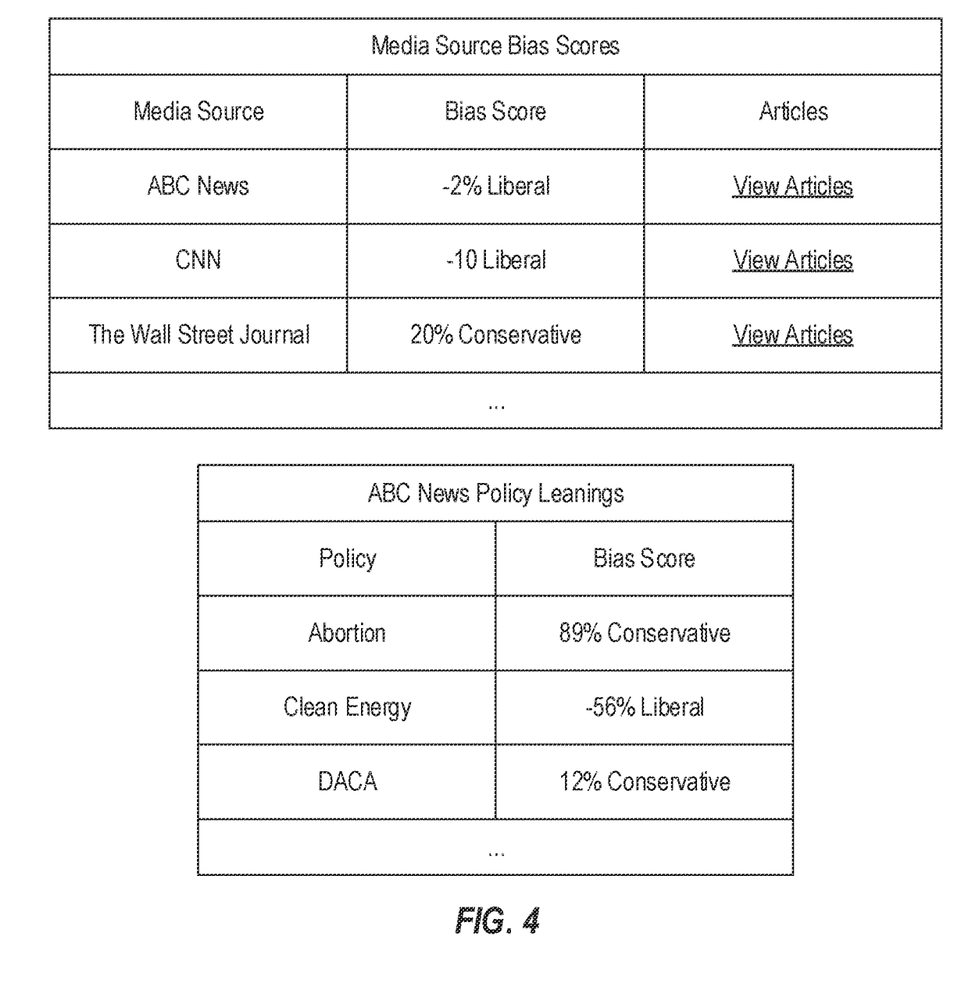
FIG. 4 provides an example of how a media bias score and other scores may be presented.

FIG. 4 provides an example where the bias scores generated for a media source's articles are combined (e.g., averaged) to yield a media bias score for the media source. For example, ABC News is shown as having a bias score of −2% liberal which could be obtained by averaged the bias scores of each ABC News article that bias score generator 120 has processed.

FIG. 4 also provides an example where per-policy bias scores are provided for a media source. As mentioned above, a per-policy bias score could be generated using the sentiment scores pertaining to a single policy across the media source's articles. For example, any sentiment score generated for the abortion policy in an ABC News article could be combined and converted into a percentage from −100% to 100% to create abortion bias score for ABC News on abortion.

In some embodiments, when a particle article is selected, bias score publisher 125 may present which entities and policies appear in the article and may present the bias score for the article (as opposed to the bias score for the media source itself). In some embodiments, bias score publisher 125 may also present a separate policy leaning score and a politician portrayal score, each of which could also be represented on a scale from −100% to 100%. The policy leaning score could be generated from the policy sentiment score for the article (i.e., without combining it with the entity sentiment score), while the politician portrayal score could be generated from the entity sentiment score for the article (i.e., without combining it with the policy sentiment score).

In some embodiments, bias score generator 120 could be used to generate an entity/policy stance score. In such embodiments, entity and policy recognizer 122 could generate an entity/policy map similar to entity map and policy map except that the entity/policy map would identify entity/policy pairs that appear in a sentence (or other portion) of an article. Using the example from FIG. 3A, the entity/policy map could include an entry for Trump/Abortion and an entry for Trump/Border Wall (assuming that both Trump and border wall appear together in a sentence in the article). Then, machine learning module 123a could calculate a sentiment for each entry in the entity/policy map. In the example from FIG. 3B, an entry for Trump/Abortion could be given a negative sentiment value to represent that Trump does not support abortion. Sentiment combiner 123b could then combine sentiment values, if necessary, to generate a sentiment score for each entity/policy pair in the entity/policy map for the article. Stance adjuster 124a could then adjust the sign of the sentiment score for the entity/policy pair in a similar manner as described with reference to FIG. 3C which would yield the entity/policy stance score for the particular entity on the particular policy based on the article. In some embodiments, an entity's entity/policy stance scores across multiple articles and/or multiple policies could be combined in a similar manner as described above to yield an entity bias score representing whether the entity is liberal or conservative in general and/or liberal or conservative with regards to a particular policy.

Figure 5:
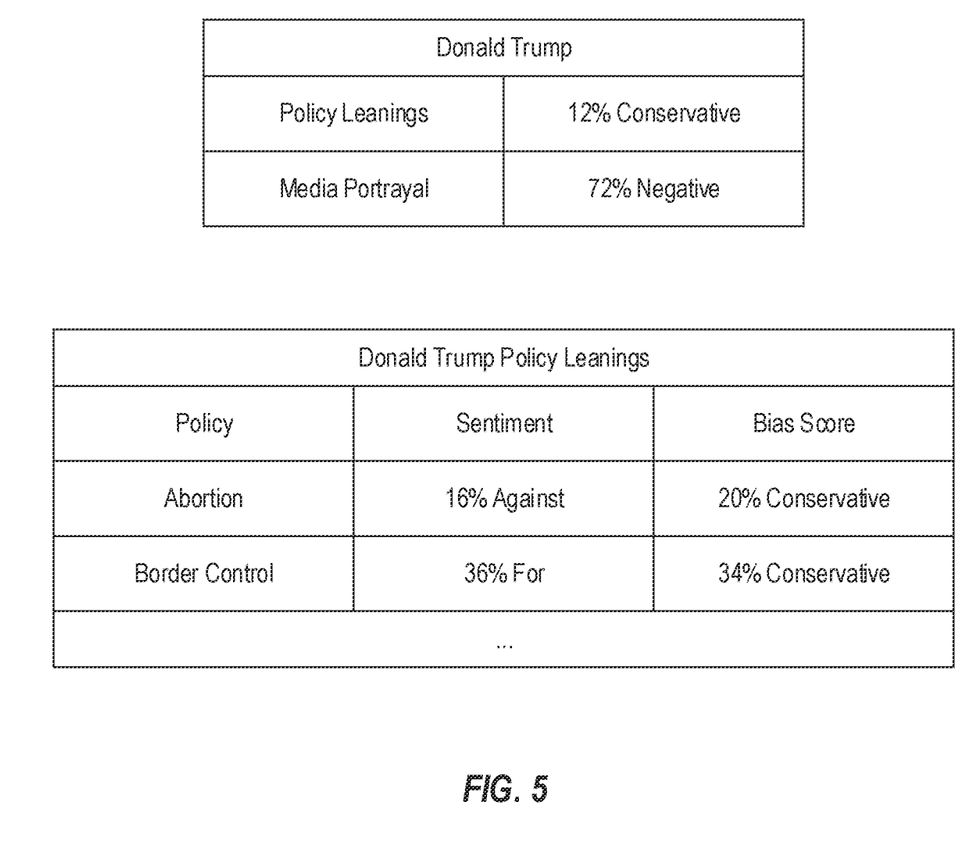
FIG. 5 provides an example of how entity-specific scores may be presented.

FIG. 5 provides an example of how scores relating to an entity may be presented. As shown, a policy leaning score of 12% conservative has been assigned to Donald Trump. This policy leaning score could be generated by combining the entity/policy stance scores generated for Donald Trump for all policies across all articles or a subset of articles. FIG. 5 also shows a media portrayal score for Donald Trump of 72% negative. This media portrayal score could be generated from the entity sentiment scores generated for Donald Trump across all articles or a subset of articles.

FIG. 5 also provides a per-policy sentiment score and a per-policy bias score for Donald Trump on a number of policies. The per-policy sentiment score can be generated by combining the entity/policy stance scores generated for Donald Trump for a particular policy across all articles or a subset of articles. The per-policy bias score can be generated by combining the bias score for articles that include Donald Trump and the particular policy.

In some embodiments, bias score generator 120 may consider other metrics in generating a bias score for an article. For example, entity and policy recognizer 122 could be modified to also identify bias loaded words or bias leaning snippets that appear in sentences (or other portions) of an article. Such bias loaded words and bias leaning snippets could be associated with a bias value (which is similar to a sentiment value for purposes of calculating bias). Accordingly, a bias loaded words map or bias leaning snippet map could be created that identifies each bias loaded word or bias leaning snippet and assigns a bias value to it. This bias loaded words map or bias leaning snippet map could be provided to bias score calculator 124 and could be considered by combiner 124b in generating the bias score for the article. For example, the bias values in the bias loaded words map or bias leaning snippet map could be combined together and then the combined bias value could be weighted and combined with the entity sentiment score and the policy sentiment score.

In summary, bias score generator can employ natural language processing and machine learning techniques to generate bias scores that accurately reflect an article's bias towards entities and policies. These bias scores, and scores and values from which they are generated, can be used in a variety of ways to give a more accurate portrayal of media bias and political stances. Consumers can therefore make more informed decisions regarding on which media sources they can rely and trust.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for generating bias scores from articles comprising:
    processing an article to identify each instance of one or more entities and each instance of one or more policies that appear in the article;
    for each instance of the one or more entities and each instance of the one or more policies that appear in the article, generating a sentiment value from a portion of the article in which the respective instance appears;
    for each of the one or more entities and the one or more policies, generating a sentiment score by combining the sentiment value for each instance of the respective entity or policy;
    for each of the one or more entities, adjusting the sentiment score of the respective entity based on a political party of the respective entity;
    for each of the one or more policies, adjusting the sentiment score of the respective policy based on a political stance for the respective policy; and
    combining the sentiment scores for the one or more entities and the one or more policies to yield a bias score for the article.

2. The method of claim 1, wherein processing the article to identify each instance of the one or more entities and each instance of the one or more policies that appear in the article comprises performing natural language processing on the article.

3. The method of claim 2, wherein the natural language processing comprises identifying named entities in the article and comparing the named entities to an entity list and a policy list, wherein the one or more entities are named entities that are included in the entity list and the one or more policies are named entities that are included in the policy list.

4. The method of claim 1, wherein processing the article to identify each instance of the one or more entities and each instance of the one or more policies that appear in the article comprises creating an entity map the includes the one or more entities and creating a policy map the includes the one or more policies.

5. The method of claim 1, wherein generating a sentiment value for each instance of the one or more entities and each instance of the one or more policies that appear in the article comprises performing aspect-based targeted sentiment analysis to generate the sentiment value.

6. The method of claim 5, wherein the aspect-based targeted sentiment analysis is performed on a sentence in which the respective instance appears.

7. The method of claim 1, wherein generating a sentiment value for each instance of the one or more entities and each instance of the one or more policies that appear in the article comprises implementing a convolutional neural network.

8. The method of claim 1, further comprising:
    processing the article to identify a single instance of another entity; and
    generating a sentiment score for the other entity based on the single instance;
    wherein the sentiment scores for the one or more entities and the one or more policies and the sentiment score for the other entity are combined to yield the bias score for the article.

9. The method of claim 1, further comprising:
    processing the article to identify a single instance of another policy; and
    generating a sentiment score for the other policy based on the single instance;
    wherein the sentiment scores for the one or more entities and the one or more policies and the sentiment score for the other policy are combined to yield the bias score for the article.

10. The method of claim 1, wherein the one or more entities are multiple entities and the one or more policies are multiple policies, the method further comprising:
    combining the sentiment scores for the entities to yield an entity sentiment score;

combining the sentiment scores for the policies to yield a policy sentiment score;
wherein combining the sentiment values to yield a bias score for the article comprises combining the entity sentiment score and the policy sentiment score.

11. The method of claim 1, further comprising:
generating bias values for bias loaded words or bias leaning snippets that appear in the article;
wherein combining the sentiment scores to yield a bias score for the article comprises combining the bias values for the bias loaded words or bias leaning snippets with the sentiment scores to yield the bias score.

12. The method of claim 1, further comprising:
combining the bias score for the article with one or more bias scores for one or more other articles to yield a media bias score.

13. One or more computer storage media storing computer executable instructions which when executed implement a method for generating bias scores from articles, the method comprising:
processing an article to generate an entity map and a policy map, the entity map identifying entities that appear in the article and a portion of the article in which each instance of each of the entities appears, the policy map identifying policies that appear in the article and a portion of the article in which each instance of each of the policies appears in the article;
for each instance of each entity in the entity map and for each instance of each policy in the policy map, processing the respective portions of the article in which the instance of the entity or policy appears to generate a sentiment value for the instance of the entity or policy;
for each entity and policy, creating a sentiment score from each sentiment values generated for each instance of the respective entity or policy;
for each entity, adjusting the sentiment score of the respective entity based on a political party of the respective entity;
for each policy, adjusting the sentiment score of the respective policy based on a political stance for the respective policy; and
combining the sentiment scores to generate a bias score for the article.

14. The computer storage media of claim 13, wherein each sentiment value is generated using a convolutional neural network.

15. The computer storage media of claim 13, wherein each sentiment value is generated using a machine learning model that implements aspect-based targeted sentiment analysis.

16. The computer storage media of claim 13, wherein the method further comprises:
combining multiple bias scores for articles to generate a media bias score.

17. The computer storage media of claim 13, wherein the method further comprises:
presenting the media bias score or the bias score to one or more end users.

18. A system for generating bias scores from articles, the system comprising:
one or more processors; and
computer storage media storing computer executable instructions which when executed by the one or more processors implement a bias score generator that includes:
an article aggregator that aggregates articles;
an entity and policy recognizer that processes the articles to identify entities and policies;
a sentiment calculator that generates sentiment values for each instance of the entities and policies using a machine learning targeted sentiment analysis;
a sentiment combiner that generates a sentiment score for each of the entities and policies by combining each sentiment value for each instance of the respective entity or policy;
a bias score calculator that adjusts the sentiment scores based on political stances and then generates a bias score for each article using the sentiment scores; and
a bias score publisher that publishes the bias scores for the articles or a media bias score generated from the bias scores for the articles.

19. The system of claim 18, wherein the bias score calculator adjusts the sentiment scores by applying a multiplier to the sentiment scores.

20. The system of claim 19, wherein:
the multiplier applied to a sentiment score for an entity is either 1 or −1 based on a political party to which the respective the entity pertains; and
the multiplier applied to a sentiment score for a policy is either 1 or −1 based on whether the respective political stance is for or against the policy.

* * * * *